（12）United States Patent
Fletcher et al.

(10) Patent No.: US 9,441,647 B2
(45) Date of Patent: Sep. 13, 2016

(54) PRESSURE PISTON ACTUATOR WITH NON-RIGID SHAFT

(71) Applicants: David Fletcher, Flint, MI (US); Brian Graichen, Leonard, MI (US); Stuart Kirby, Pontevedra (ES)

(72) Inventors: David Fletcher, Flint, MI (US); Brian Graichen, Leonard, MI (US); Stuart Kirby, Pontevedra (ES)

(73) Assignee: DAYCO IP HOLDINGS, LLC, Troy, MI (US)

( * ) Notice: Subject to any disclaimer, the term of this patent is extended or adjusted under 35 U.S.C. 154(b) by 377 days.

(21) Appl. No.: 14/045,291

(22) Filed: Oct. 3, 2013

(65) Prior Publication Data
US 2014/0096675 A1 Apr. 10, 2014

Related U.S. Application Data

(60) Provisional application No. 61/710,632, filed on Oct. 5, 2012.

(51) Int. Cl.
| | |
|---|---|
| *F16J 1/22* | (2006.01) |
| *F15B 15/28* | (2006.01) |
| *F02B 37/18* | (2006.01) |
| *F15B 15/14* | (2006.01) |

(52) U.S. Cl.
CPC ............ *F15B 15/28* (2013.01); *F02B 37/186* (2013.01); *F15B 15/1466* (2013.01); *F15B 15/2807* (2013.01); *F16J 1/22* (2013.01); *Y02T 10/144* (2013.01)

(58) Field of Classification Search
CPC .... F16J 1/22; F16J 15/1476; F15B 15/1476; F15B 15/1466
See application file for complete search history.

(56) References Cited

U.S. PATENT DOCUMENTS

| | | | |
|---|---|---|---|
| 4,256,019 A | 3/1981 | Braddick | |
| 4,391,184 A | 7/1983 | Yamane et al. | |
| 4,549,470 A | 10/1985 | Yogo | |
| 4,702,155 A | 10/1987 | Hildebrand et al. | |
| 5,207,301 A | 5/1993 | Kruckemeyer et al. | |
| 5,487,273 A | 1/1996 | Elpern et al. | |
| 5,586,744 A | 12/1996 | Smith et al. | |
| 5,746,058 A | 5/1998 | Vertanen | |
| 5,839,290 A | 11/1998 | Nazeri | |
| 5,913,945 A | 6/1999 | Froelich et al. | |
| 6,405,535 B1 | 6/2002 | McEwan | |
| 6,658,846 B1 | 12/2003 | McEwan | |
| 6,837,145 B1 * | 1/2005 | McBride et al. | 92/131 |

(Continued)

OTHER PUBLICATIONS

PCT, International Search Report and Written Opinion, International Application No. PCT/US2013/063230 (Oct. 3, 2013).

*Primary Examiner* — F. Daniel Lopez
(74) *Attorney, Agent, or Firm* — Thompson Hine LLP

(57) ABSTRACT

Pressure piston actuators and systems for control of wastegate in a turbocharger pressure that include the pressure piston actuators are disclosed. The pressure piston actuator includes a housing defining a chamber and a pathway leading to the chamber, a piston disposed within the chamber, a rod connected to the piston by a ball-and-socket joint, and a spring disposed in the chamber to bias the piston, and hence the rod, into a retracted position. Then, when fluid is introduced into the chamber, the fluid applies pressure to the piston. Once the pressure overcomes the bias of the spring, the piston, and hence the rod, moves into an extended position. For the system, the pressure piston actuator has the connector on the end of the rod opposite the ball-and-socket joint connected to the valve portion of a wastegate of a turbocharger.

19 Claims, 6 Drawing Sheets

(56) References Cited

U.S. PATENT DOCUMENTS

| | | | |
|---|---|---|---|
| 6,863,260 B2 | 3/2005 | Medina | |
| 6,973,867 B2 * | 12/2005 | Frisch | F15B 15/202 91/459 |
| 7,197,974 B2 * | 4/2007 | Glasson | F15B 15/283 33/763 |
| 7,290,392 B2 | 11/2007 | Jones | |
| 8,469,333 B2 | 6/2013 | Medina | |
| 2002/0149248 A1 * | 10/2002 | Jackson | 297/330 |
| 2005/0050888 A1 | 3/2005 | McEwan | |
| 2007/0257219 A1 | 11/2007 | Perrin | |
| 2009/0288725 A1 * | 11/2009 | Pawelski | 137/885 |
| 2011/0220214 A1 * | 9/2011 | Medina | 137/12 |
| 2012/0056115 A1 | 3/2012 | Briley et al. | |
| 2013/0092863 A1 | 4/2013 | Christmann | |

* cited by examiner

PRESSURE PISTON ACTUATOR WITH NON-RIGID SHAFT

RELATED APPLICATIONS

This application claims the benefit of U.S. Provisional Application No. 61/710,632, filed Oct. 5, 2012,

TECHNICAL FIELD

This application relates to pressure piston actuators, more particularly to pressure piston actuators for operation of a turbine wastegate such as those in turbochargers or internal combustion engine turbo systems.

BACKGROUND

Today, a majority of the wastegate pressure or vacuum actuators are made by using a diaphragm. The drawbacks of these designs are that the shaft allows for only a few degrees of angular freedom and no rotation. Side loading and torsional forces will shorten the life and performance of a diaphragm actuator and limit their application. Diaphragms are like a spring, the more you compress or extend a spring, the more force it takes. Diaphragms are similar to springs because the further you travel with a diaphragm, the more force it takes to move it. Diaphragm actuators usually also include a return spring which compounds the effort required to move the actuator. There is always going to be a limit to travel with a diaphragm actuator because the stretch allowed by the rubber diaphragm is limited.

Accordingly, there is a need for improved actuators to operate wastegates with increased degrees of angular freedom and rotation of the shaft and that can accept side loading forces and torsional forces.

SUMMARY

In one aspect, pressure piston actuators are disclosed herein for connection to a wastegate to control the operation (opening, closing, partial opening) thereof. The pressure piston actuators have increase degrees of angular freedom and up to 360 degrees of rotation of the shaft and perform well without reduced life under side loading and/or torsional forces. The pressure piston actuators include a housing defining a chamber and a pathway leading to the chamber, a piston disposed within the chamber, a rod connected to the piston by a ball-and-socket joint, and a spring disposed in the chamber to bias the piston, and hence the rod, into a retracted position The piston is movable between the retracted position and an extended position and is moved to the extended position when fluid introduced into the chamber applies pressure to the piston in an amount that overcomes the bias of the spring. The rod includes a connector on the end opposite the ball-and-socket joint for connection to the wastegate.

In one embodiment, the pressure piston actuator also includes a position sensor to sense the position of the piston. The position sensor may be any suitable sensor, but in one embodiment is a Hall effect sensor comprising a position magnet moveable with the piston and a sensor chip to sense the magnet's position. Additionally, an electrical connector may be included as part of the housing and electrically connected to the position sensor. The electrical connector is one configured for electrically connecting to an external electrical device such as a computer processing unit.

In another aspect, disclosed are systems for controlling a wastegate in a turbocharger using one of the pressure piston actuators. The system includes a pressure piston actuator such as the one described above and a turbocharger that includes a wastegate having a valve that is connected to the connector on the end of the rod opposite the ball-and-socket joint.

DETAILED DESCRIPTION

Figure 1:
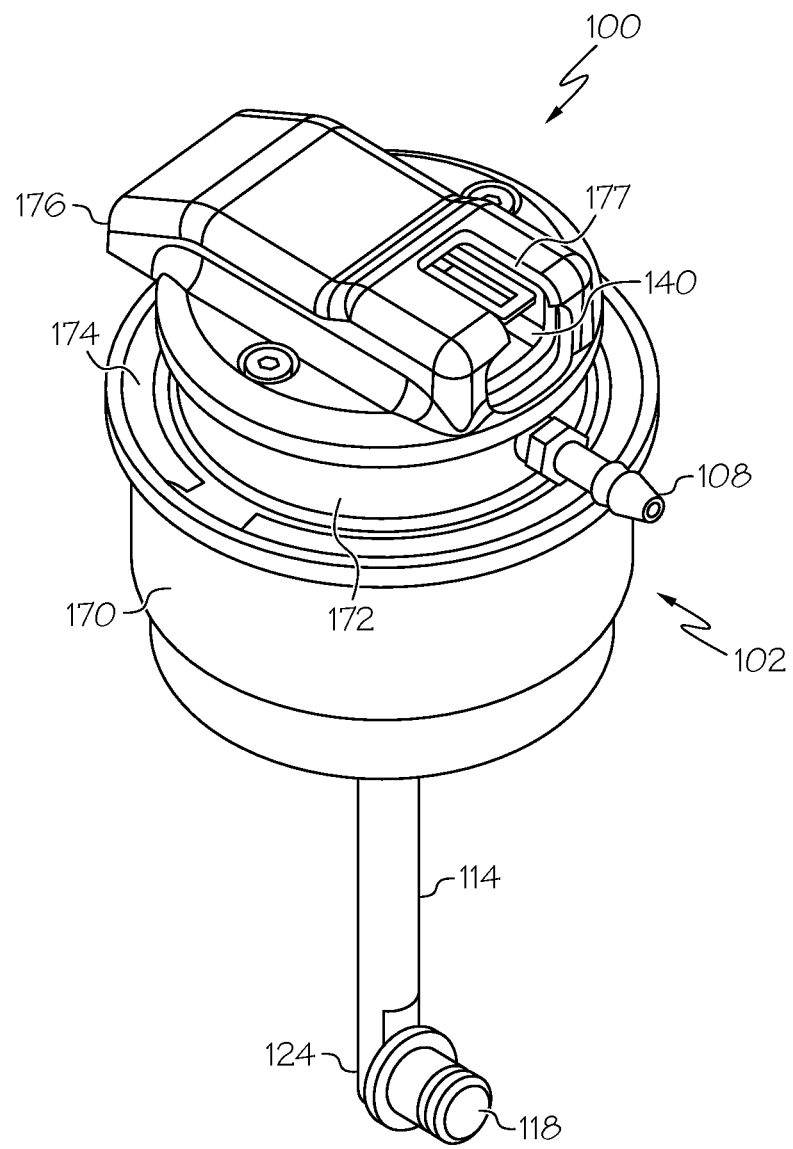
FIG. 1 is a front perspective view of one embodiment of a pressure piston actuator diagram.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

An internal combustion engine turbo system typically includes the following components in controlling the operating parameters of a turbocharger: an exhaust-driven turbocharger with a turbine section and compressor section, a turbine bypass valve commonly referred to as a wastegate, and optionally a compressor recirculation valve. The exhaust-driven turbocharger typically includes an exhaust housing containing a turbine wheel that harnesses and converts exhaust energy into mechanical work through a common shaft to turn a compressor wheel that ingests air, compresses it and feeds it at higher operating pressures into an inlet of an internal combustion engine. The wastegate is a control valve used to meter the exhaust volume coming from the exhaust manifold of the internal combustion engine and the energy available to power the exhaust-driven turbocharger turbine wheel. The wastegate works by opening a valve to a bypass so that exhaust flows away from the turbine wheel, thereby having direct control over the speed of the exhaust-driven turbocharger and the resultant operating pressure of the internal combustion engine intake manifold.

Figure 2:
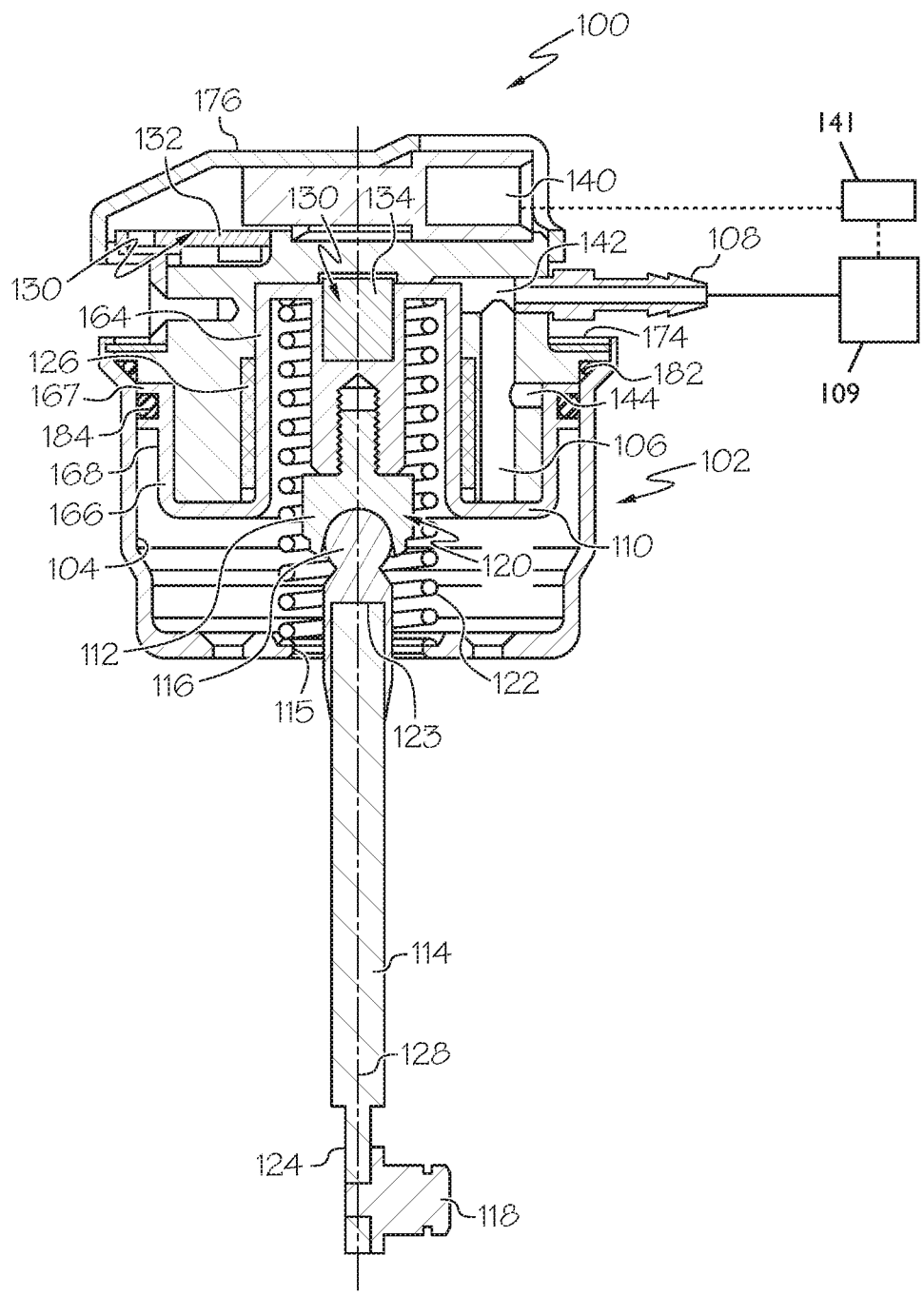
FIG. 2 is a cross-sectional view of the pressure piston actuator of FIG. 1 in a retracted piston position.
Figure 3:
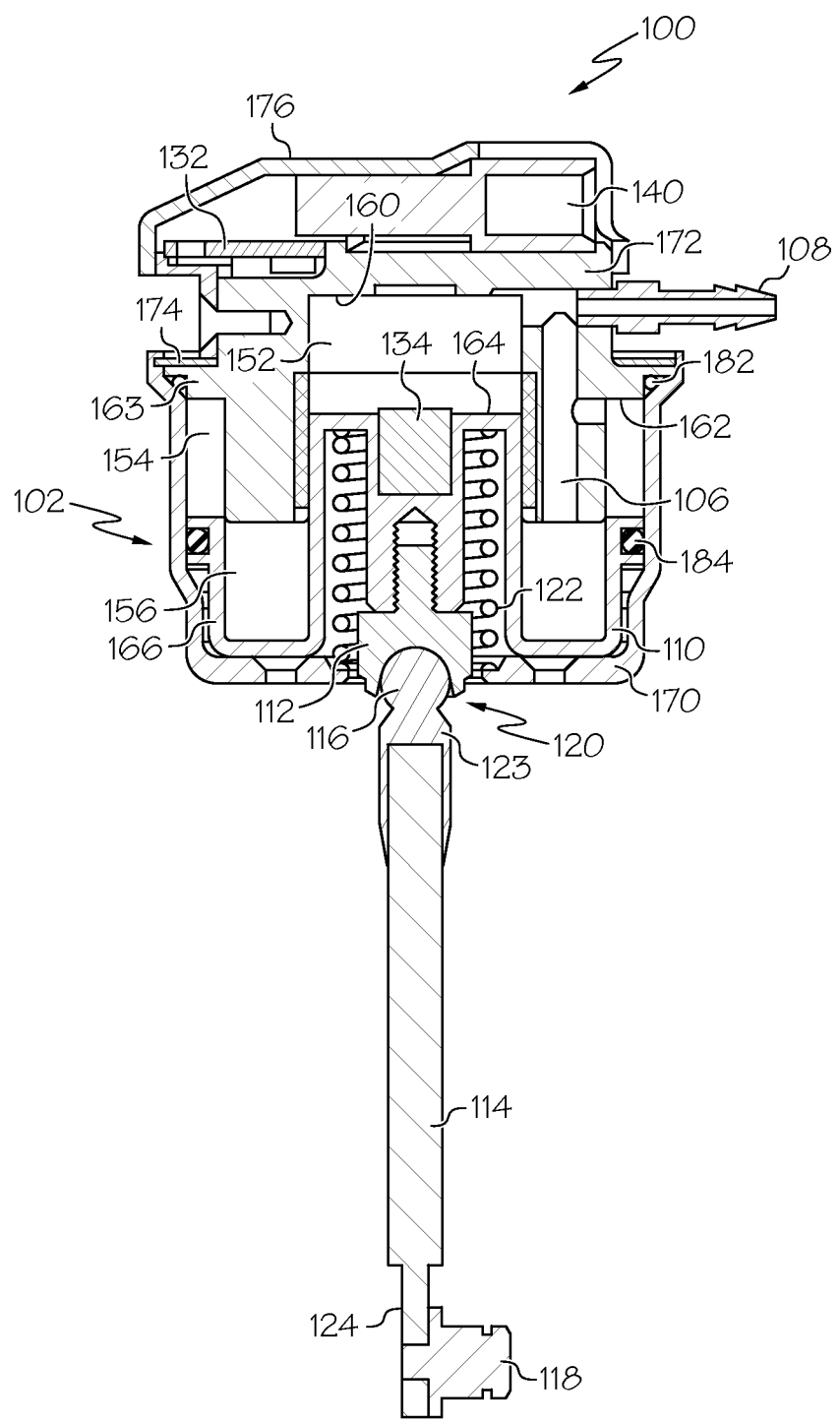
FIG. 3 is a cross-sectional view of the pressure piston actuator of FIG. 1 in an extended piston position.

FIGS. 1-3 illustrate one embodiment of a pressure piston actuator 100 for use in an internal combustion engine turbo system, in particular to actuate and/or control the operation of a wastegate. The pressure piston actuator 100 includes a housing 102 enclosing a piston 110 that has a rod 114 connected thereto by a ball-and-socket joint 120 (FIGS. 2 and 3). The rod 114 extends through the housing (through opening 115 (FIG. 2)) and is connectable to the wastegate (not shown) at the end 124 opposite the ball-and-socket joint 120. Accordingly, the pressure piston actuator 100 controls the opening and closing of the wastegate by the movement of the piston 110. As seen in FIGS. 2 and 3, the piston 110 is movable between and in-between a retracted position (FIG. 2) and an extended position (FIG. 3). The piston 110 is not a diaphragm. The piston 110 is a generally rigid body that translates along the central longitudinal axis 128 (FIG. 2) in response to a pressure change within the housing 102. A spring 122 is seated underneath the piston 110 to bias the piston 110 generally into the retracted position. Thus, to move the piston 110 and rod 114 into the extended position the introduction of fluid into the pressure piston actuator 100 must be greater than the biasing force applied by spring 122. The inventive pressure piston actuator 100 improves the control of the wastegate by providing faster response times for moving the valve of the wastegate through the application of the fluid simultaneously to a plurality of surfaces of the piston. Also, the actuator 100 enables variable control of the valve at partial open positions, which can be maintained for a period of time and/or adjusted. Variable control may be achieved not only by the introduction of fluid into the pressure piston actuator 100 through port 108, but may also be achieved by the removal of fluid therefrom. Moreover, the inclusion of the ball-and-socket joint 120 allows 360° rotation and more extreme angular variation in connection and operation of the wastegate, which lengthens the life and performance of the pressure piston actuator 100.

The housing 102 is a multi-piece construction, as labeled in FIG. 1, that includes a container portion 170 that defines the chamber 104 (see FIGS. 2 and 3) and a cap 172 that closes one end of the chamber 104. The cap 172 is sealingly connectable to the container portion 170 and may be held in place by a retaining ring 174. The cap 172 may also include a secondary cover 176 to protect any electronics included or connected to the cap 172. When electronics are included in the pressure piston actuator 100 the secondary cover 176 may include an opening 177 providing access to an electrical connector 140.

Figure 5:
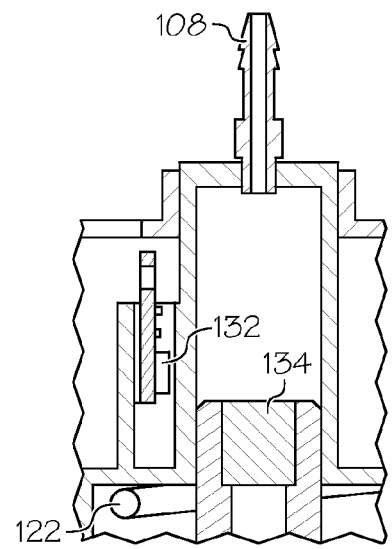
FIG. 5 is a partial view, in cross-section, of an embodiment showing an alternate position for a portion of a position sensor.

Looking at the cross-sections in FIGS. 2 and 3, the chamber 104 within the housing 102 includes a pathway 106 leading to the chamber 104 and a port 108, which can operate as an inlet and/or an outlet, in fluid communication with the pathway 106. Port 108 as seen in the figures is a side loading port, i.e., the port enters the chamber 104 from the left or the right based on the orientation of the drawings in FIGS. 2 and 3 rather than down through the top. However, the position of the port is not limited thereto and may enter the chamber 104 through the top as shown in FIG. 5.

Referring back to FIGS. 2 and 3, the port 108 is generally perpendicular to the central longitudinal axis 128 (FIG. 2) of the rod 114. The pathway 106 may include one or more branches 142, 144 (labeled in FIG. 2) that connect the port 108 in fluid communication with a plurality of subchambers, described in detail below, which are present when the piston 110 is in the extended position (FIG. 3). The branches 142, 144 may place the port 108 in simultaneous fluid communication with the plurality of subchambers. As seen in FIGS. 2 and 3, port 108 is the only port having fluid communication with the chamber 104 and all subchambers formed therein.

In the particular embodiment illustrated in FIG. 3, subchambers 152, 154, and 156 are present and are defined in part by the container portion 170, the cap 172, and the piston 110, and in particular by the male and female members of the piston 110 and cap 172, respectively. The cap 172 includes a central female member 160 and an annular female member 162 concentric about the central female member 160. The annular female member 162 may be the result of an annular shoulder 163 of the cap 172 creating a gap between the cap 172 and the container portion 170. The piston 110 includes a central male member 164 and an annular male member 166 concentric about and spaced a distance from the central male member 164 such that the male members 164, 166 are receivable in the central female member 160 and the annular female member 162, respectively. As such, the central female member 160 and the central male member 164 define the first subchamber 152, the annular female member 162 and the annular male member 166 define the second subchamber 154, and in between these two subchambers 152, 154, the contours of the cap 172 and the piston 110 define a third subchamber 156.

As labeled in FIG. 3, the pressure piston actuator 100 includes sealing members 182, 184. The first sealing member 182 is disposed where the shoulder 163 of the cap is seated against the container portion 170. The second sealing member 184 is seated in a thickened rim 167 (label on FIG. 2) on the outer surface 168 (the surface facing the inner surface of the container portion 170) of the annular male member 166 of the piston 110. The sealing members 182, 184 may be O-rings, V-rings, X-rings, or other annular seals made of sealing material for sealing engagement against another member of the actuator 100. It is important to note that there are no seals present between the subchambers 152, 154, and 156. Accordingly fluid is able to flow into and between these portions of chamber 104, which have been designated herein as subchambers.

As discussed above, the pressure piston actuator 100 includes a ball-and-socket joint 120 connecting the rod 114 to the piston 110. As shown in FIGS. 2 and 3 the rod 114 includes a first end 123 having a ball head 116 and a second end having a connector 118 that is connectable to a wastegate, and the piston 110 includes a ball socket 112 connected, fixed or removeably, to the piston 110. The ball-and-socket joint 120 is formed when the ball head 116 of the rod 114 is seated in the ball socket 112. In one embodiment, the ball socket 112 is threadedly connected to the piston 110 and as such the position of the second end 124 of the rod 114 can be changed. The threaded connection is advantageous in connecting the pressure piston actuator 100 to a given turbo system and, in particular, to the wastegate because the rod 114 can be rotated to adjust the threadedly connected ball socket 112 to change the position of the connector, bringing it into alignment with the wastegate for connection to connector 118.

The pressure piston actuator 100 further includes a guide bushing 126 positioned within the central female member 160. The guide bushing 126 may be seated on a ledge within the central female member 160 such that the guide bushing 126 defines a portion of the inner surface of the central female member 160. This guide bushing 126 is advantageous because the pressure piston actuator 100 can be side loaded without any effect on the performance of the piston 110.

The pressure piston actuator 100 may also include a position sensor 130 to determine the position of the piston 110, which can be correlated to the position of the wastegate, i.e., closed, fully open, or any position between closed and fully open. The position sensor 130 may be any device that permits position measurement. The position sensor 130 may be a capacitive transducer, an eddy-current sensor, a grating senor, a Hall-effect sensor, an inductive non-contact position sensor, a laser Doppler Vibrometer (optical), a linear variable differential transformer (LVDT), a multi-axis displacement transducer, a photodiode array, a piezo-electric transducer (piezo-electric), a potentiometer, a proximity sensor (optical), a seismic displacement pick-up, a string potentiometer (also known as string pot., string encoder, cable position transducer), or a combination thereof.

In the embodiment of FIGS. 2 and 3 the position sensor 130 is a relative position sensor (e.g., a displacement sensor) based on movement of the piston 110. The relative position sensor may be a Hall-effect sensor comprising a chip/Hall-effect position sensor 132 that senses the displacement of magnet 134, which is seated in the piston 110 for translation therewith. In one embodiment, the magnet 134 is seated in a recess in the central male member 164. Alternately, the magnet 134 may be mounted on or inside the piston 110. The chip 132 may be electrically connected to an electrical connector 140. The electrical connector 140 may be a plug or receptacle capable of receiving a cable (not shown) to connect the electrical connector 140 to an external device 141 (e.g., a controller for a fluid source, computer processing unit, or other device). As illustrated in FIGS. 2 and 3, the position sensor 132 is positioned generally horizontally within the construction, i.e., relative to the orientation of the pressure piston actuator 100 relative to the page as illustrated in the figures, and above the magnet 134. As illustrated in FIG. 5, the position sensor 132 may be positioned generally vertically within the construction at a position where the magnet 134 can pass by the position sensor 132 in at least one direction of travel of the piston 110.

The port 108 of the pressure piston actuator 100 is connectable to a fluid source 109 to create pressure changes within the chamber 104. The fluid source 109 may include a controller to control the flow of fluid from the fluid source 109 into or out of the port 108. The fluid source's controller may be electrically connected to a computer processing unit (not shown) that is also electrically connected to the electrical connector 140 and hence to the chip 132 of the position sensor 130. Thus, the computer processing unit can receive signals from chip 132 corresponding to the position of the piston 110 and hence the position of the wastegate to determine when to turn the fluid source 109 on or off, or to reverse the fluid source 109 to remove fluid from the chamber 104 to change the position of the wastegate. With the pressure piston actuator 100 the wastegate may be selectively opened to a desired displacement including a plurality of partial open positions such that operating pressures within the turbo system can be controlled to produce a desired effect.

Figure 4:
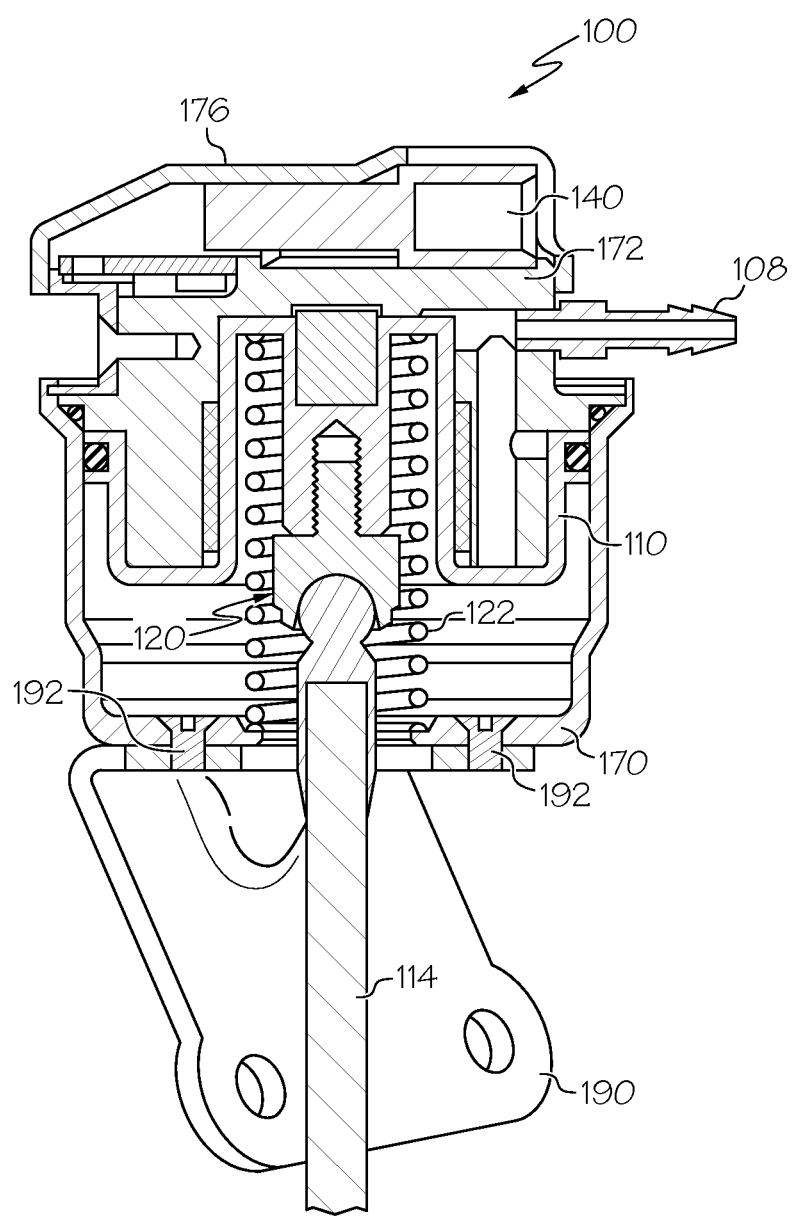
FIG. 4 is a cross-sectional view of one embodiment of a pressure piston actuator that includes a mounting plate.

Referring now to FIG. 4, the pressure piston actuator 100 may include a mounting member 190 for mounting the actuator to the turbo system for connection to the wastegate. The mounting member may vary in shape and configuration as needed to connect the pressure piston actuator 100 to a given turbo system. The mounting member may be removeably connected or fixedly connected to the container portion 170 of the housing 102. In the embodiment shown in FIG. 4, the mounting member 190 is removeably connected to the bottom of the container portion 170 by fasteners 192. The fasteners may be screws, bolts, rivets, welds, or other known fasteners.

Figure 6:
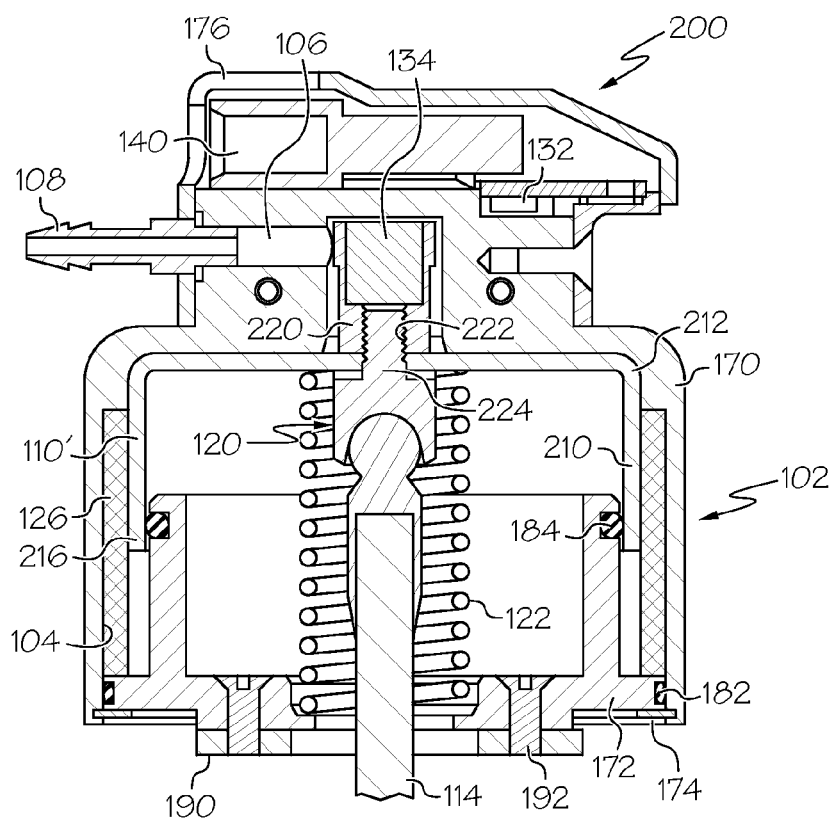
FIG. 6 is a cross-sectional view of another embodiment of a pressure piston actuator in a refracted position.
Figure 7:
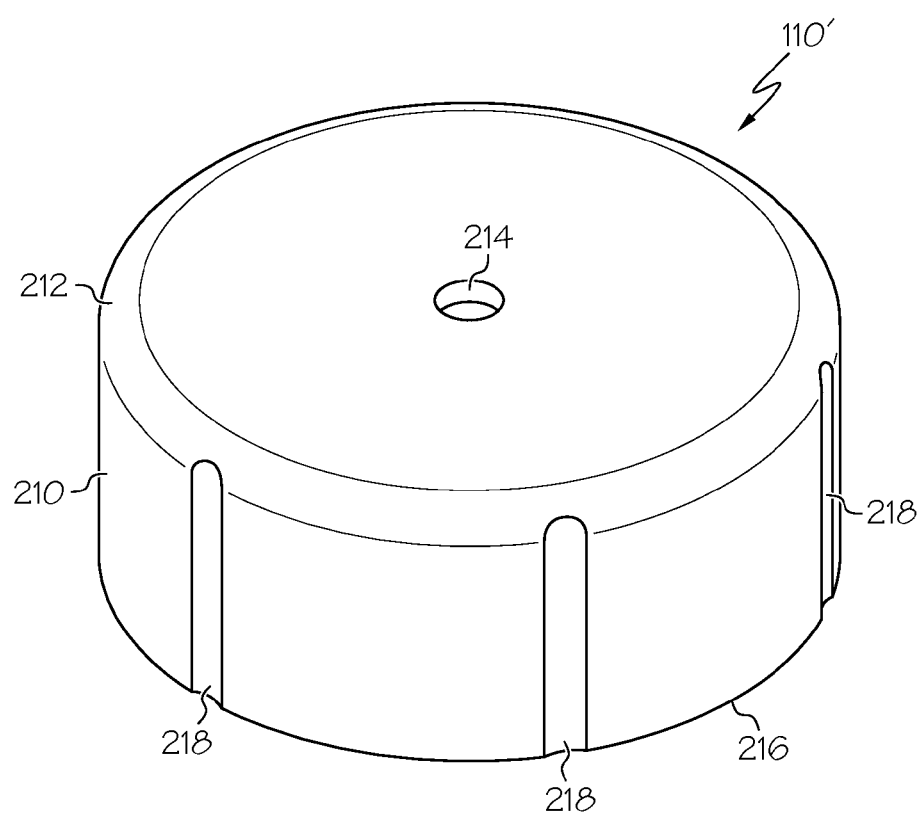
FIG. 7 is a side perspective view of the piston from the pressure piston actuator of FIG. 6.

Referring now to FIGS. 6 and 7, a second embodiment of a pressure piston actuator, generally designated by reference numeral 200, is provided that has a simplified piston configuration, i.e., piston 110'. The piston 110' provides a reduction in material and fabrication costs, but otherwise the pressure piston actuator 200 includes generally the same components (as exemplified by use of the same reference numerals as found in FIGS. 1-4) and operates generally the same as the pressure piston actuator 100. The description above is fully applicable to pressure piston actuator 200.

The pressure piston actuator 200 has a housing 102 that includes a container portion 170 that defines the chamber 104 (FIG. 6) and a cap 172 that closes one end of the chamber 104. The cap 172 is sealingly connectable to the container portion 170 and may be held in place by a retaining ring 174. One difference between the embodiment in FIG. 6 and the embodiment in FIGS. 1-4 is that the cap 172 is oriented to close the bottom end of the container 170, based on the orientation of the drawings relative to the page, rather than the top end of the container as shown in FIGS. 1-4.

Another difference as indicated above is the simplified piston 110'. The piston 110' is a generally hollow cylindrical member 210 having a closed first end 212 that defines a bore 214 for connection to the ball-and-socket joint and an open second end 216 opposite the first end 212. The exterior surface of the hollow cylindrical member 210 may define one or more flutes 218 that provide fluid flow channels for the fluid to move around and/or over the piston 110' as it moves between its various positions within the housing 102. Additionally, the simplified piston 110', rather than having the magnet 134 mounted therein as shown in FIGS. 1-4, has the magnet 134 connected thereto by a magnet holder 220 that also serves the purpose of connecting a member of the ball-and-socket joint 120 to the piston 110'. The magnet holder 220 includes one portion of a connector 222, a threaded socket in FIG. 6, and the ball-and-socket joint includes a second portion of a connector 224, a threaded member for threading into the threaded socket in FIG. 6, but is not limited thereto. The connectors may alternately form a snap fit connection, a riveted connection, or any other type of well-known connection.

Having described the invention in detail and by reference to preferred embodiments thereof, it will be apparent that modifications and variations are possible without departing from the scope of the invention which is defined in the appended claims.

What is claimed is:

1. A pressure piston actuator comprising:
   a housing defining a chamber and a pathway leading to the chamber;
   a piston disposed within the chamber, the piston being movable between at least a retracted position and an extended position and dividing the chamber into a plurality of subchambers each defined at least partially by a portion of an upper surface of the piston;
   a rod connected to the piston by a ball-and-socket joint; and
   a spring disposed in the chamber to bias the piston, and hence the rod, toward the retracted position;
   wherein the pathway branches to simultaneously apply fluid to the portion of the upper surface of the piston within each of the plurality of subchambers, which collectively is the application of fluid to generally the entire upper surface of the piston, and
   wherein fluid introduced into the chamber applies pressure to the piston in an amount that overcomes the bias of the spring, moves the piston, and hence the rod, toward the extended position.

2. The pressure piston actuator 1, wherein, with the pressure piston actuator oriented with the rod extending downward relative to the ground, the spring is disposed underneath the piston.

3. The pressure piston actuator 1, further comprising a port coupled to the pathway for fluid communication with the chamber and an external source of positive or negative pressure.

4. The pressure piston actuator 1, further comprising a connector on the end of the rod opposite the ball-and-socket joint.

5. The pressure piston actuator of claim 1, further comprising a position sensor to sense the position of the piston.

6. The pressure piston actuator of claim 5, wherein the position sensor is a Hall-effect sensor comprising a position magnet moveable with the piston and a sensor chip to sense the magnet's position.

7. The pressure piston actuator of claim 5, further comprising an electrical connector included as part of the housing and electrically connected to the position sensor, the electrical connector being electrically connectable to an external electrical device.

8. The pressure piston actuator of claim 1, wherein the housing defines at least a female member having received therein a male member defining at least a portion of the piston.

9. The pressure piston actuator of claim 8, further comprising a guide bushing forming at least a portion of the interior surface of the female member.

10. The pressure piston actuator of claim 9, wherein the female member of the housing is a central female member that includes the guide bushing as a portion of the interior surface thereof and the housing includes an annular female member concentric about the central female member; wherein the male member of the piston is a central male member and the male member includes an annular male member concentric about and spaced a distance from the central male member; and wherein the central male member and the annular male member of the piston are received in the central female member and the annular female member, respectively.

11. The pressure piston actuator of claim 10, wherein in a fully retracted position the central male member and annular male member of the piston are fully received in the central female member and annular female member of the housing, respectively.

12. The pressure piston actuator of claim 10, wherein in an extended position, whether partial or full, the mating of the central male member and annular male member of the piston in the central female member and annular female member of the housing, respectively, defines three subchambers.

13. A system for control of the wastegate in a turbocharger, the system comprising:
   a piston actuator comprising:
      a housing defining a chamber and a pathway leading to the chamber;
      a piston disposed within the chamber, the piston being movable between at least a retracted position and an extended position and dividing the chamber into a plurality of subchambers each defined at least partially by a portion of an upper surface of the piston;
      a rod connected to the piston by a ball-and-socket joint;
      a spring disposed in the chamber to bias the piston, and hence the rod, into the retracted position; and
      a connector on the end of the rod opposite the ball-and-socket joint;
      wherein the pathway branches to simultaneously apply fluid to the portion of the upper surface of the piston within each of the plurality of subchambers, which collectively is the application of fluid to generally the entire upper surface of the piston, and
      wherein fluid introduced into the chamber applies pressure to the piston in an amount that overcomes the bias of the spring, moves the piston, and hence the rod, into the extended position; and
   a turbocharger comprising:
      a wastegate having a valve that is connected to the connector on the end of the rod opposite the ball-and-socket joint.

14. The system of claim 13, further comprising a position sensor to sense the position of the piston.

15. The system of claim 14, wherein the position sensor is a Hall-effect sensor comprising a position magnet moveable with the piston and a sensor chip to sense the magnet's position.

16. The system of claim 14, further comprising an electrical connector included as part of the housing and electrically connected to the position sensor, the electrical connector being electrically connectable to an external electrical device.

17. The system of claim 16, wherein the external electrical device processes signals from the position sensor to determine when to turn a fluid source coupled to the pathway in the housing on, off, or reverse to selectively change the position of the valve of the wastegate to a desired placement including a plurality of partial open positions.

18. A pressure piston actuator comprising:
   a housing defining a chamber and a pathway leading to the chamber;
   a piston disposed within the chamber, the piston being movable between at least a retracted position and an extended position;
   a rod connected to the piston by a ball-and-socket joint; and
   a spring disposed in the chamber to bias the piston, and hence the rod, toward the retracted position;
   wherein fluid introduced into the chamber applies pressure to the piston in an amount that overcomes the bias of the spring, moves the piston, and hence the rod, toward the extended position, wherein with the rod fully extended a portion of the ball-and-socket joint is positioned outside of the housing.

19. The pressure piston actuator of claim 18 wherein the ball-and-socket joint is threadably connected to the piston for adjusting a length of the rod to retrofit the pressure piston actuator to a turbocharger.

\* \* \* \* \*